United States Patent
Small et al.

(10) Patent No.: US 8,018,176 B1
(45) Date of Patent: Sep. 13, 2011

(54) SELECTABLE POWER FET CONTROL FOR DISPLAY POWER CONVERTER

(75) Inventors: Jeffrey A. Small, Rochester, NY (US); Anirudh Oberoi, Rochester, NY (US)

(73) Assignee: National Semiconductor Corporation, Santa Clara, CA (US)

( * ) Notice: Subject to any disclaimer, the term of this patent is extended or adjusted under 35 U.S.C. 154(b) by 954 days.

(21) Appl. No.: 11/770,539

(22) Filed: Jun. 28, 2007

(51) Int. Cl.
*H05B 37/02* (2006.01)

(52) U.S. Cl. ........ 315/291; 315/294; 315/307; 323/282; 363/59

(58) Field of Classification Search ............... 315/169.4, 315/225–226, 287, 291, 294, 299, 307, 308; 323/207, 265, 282, 285; 363/13, 21.04, 21.09, 363/59, 60, 123, 147
See application file for complete search history.

(56) References Cited

U.S. PATENT DOCUMENTS

| | | | | |
|---|---|---|---|---|
| 5,896,287 A * | 4/1999 | Mihara et al. | ............... | 363/132 |
| 6,437,515 B1 * | 8/2002 | Kamoi et al. | ............ | 315/209 R |
| 6,898,096 B2 * | 5/2005 | Endo et al. | ............... | 363/147 |
| 6,980,189 B2 * | 12/2005 | Maruoka et al. | ............... | 345/94 |
| 7,098,526 B2 | 8/2006 | Kobayashi et al. | ............ | 257/660 |
| 7,102,611 B2 | 9/2006 | Chung | ............... | 345/98 |
| 7,274,159 B2 * | 9/2007 | Jeon | ............... | 315/307 |
| 2002/0175890 A1 * | 11/2002 | Dosho et al. | ............... | 345/100 |
| 2005/0200310 A1 * | 9/2005 | Brown | ............... | 315/291 |
| 2006/0170400 A1 * | 8/2006 | Pai | ............... | 323/265 |
| 2009/0096389 A1 * | 4/2009 | Tamegai et al. | ............... | 315/307 |
| 2009/0284171 A1 * | 11/2009 | Bayadroun | ............... | 315/294 |

OTHER PUBLICATIONS

Jackson C. Hwang, "Advanced Low-Cost Bare-Die Packaging Technology for Liquid Crystal Displays," *IEEE*, vol. 18/3, Sep. 1995, pp. 458-461.

* cited by examiner

*Primary Examiner* — Douglas W Owens
*Assistant Examiner* — Tung X Le

(57) ABSTRACT

A chip-on-glass (COG) display driver comprises a direct current to direct current converter (DC-DC) converter that uses "off-glass" and/or "off-chip" inductive/capacitive (LC) components. The DC-DC converter can be configured to use either an internal or external switch (such as a power FET) in response to a mode signal. Selection of an internal or external mode allows a single converter chip design to be optimized for various applications.

20 Claims, 4 Drawing Sheets

SELECTABLE POWER FET CONTROL FOR DISPLAY POWER CONVERTER

FIELD OF THE INVENTION

The present disclosure generally relates to power converters. More particularly, the present disclosure relates to power converters for displays.

BACKGROUND

Displays for computers and computerized devices typically use liquid crystal display-type technology. Liquid crystal displays (LCDs) often comprise circuitry (including, for example, thin film transistors) that is formed on a glass substrate. Light emitting diodes (LEDs) are used to provide backlighting for pixel cells within an LCD display.

Often, the power requirements of the circuitry and backlighting of LCDs is in excess of the capacities of devices and structures formed on the glass substrate of the LCD. Circuitry that is external to the LCDs is often used for generating and regulating voltages that are sufficient to drive the backlighting as well as the circuitry on the glass substrate. However, resistances encountered in various connections can lead to inefficient power consumption of the generated power.

BRIEF DESCRIPTION OF THE DRAWINGS

Non-limiting and non-exhaustive embodiments are described with reference to the following drawings.

DETAILED DESCRIPTION

Figure 1:
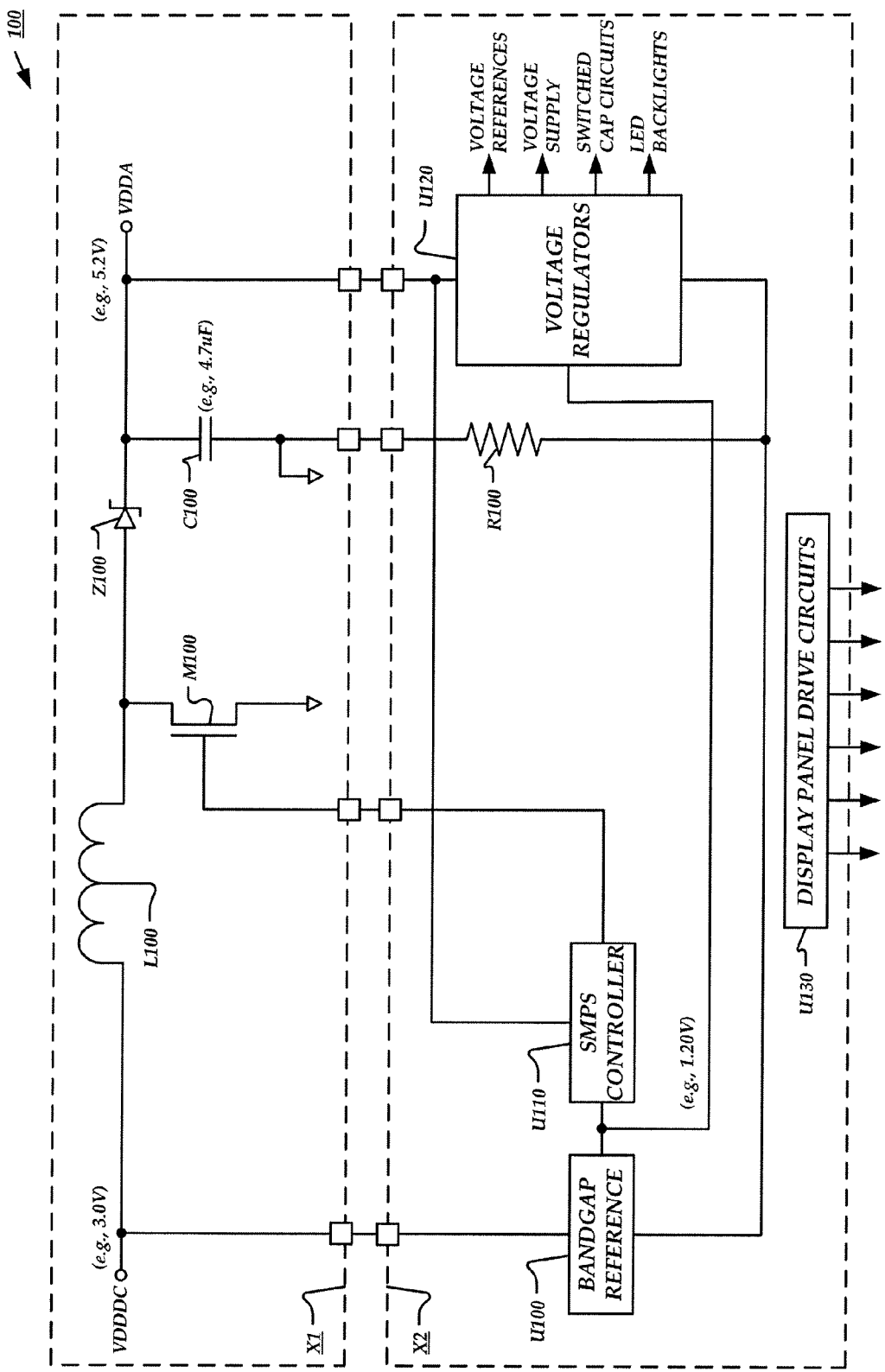
FIG. 1 is a schematic diagram illustrating a display power converter with an external power FET.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electro-magnetic, mechanical, logical, or other connection between the items connected, without any electrical, mechanical, logical or other intermediary therebetween. The term "coupled" can mean a direct connection between items, an indirect connection through one or more intermediaries, or communication between items in a manner that may not constitute a connection. The term "circuit" can mean a single component or a plurality of components, active and/or passive, discrete or integrated, that are coupled together to provide a desired function. The term "signal" can mean at least one current, voltage, charge, data, or other such identifiable quantity.

Briefly stated, the present disclosure generally relates to an example chip-on-glass (COG) display driver comprising a direct current to direct current (DC-DC) converter that comprises "off-glass" and/or "off-chip" inductive/capacitive (LC) components. The DC-DC converter can be configured to use either an internal or external switch (such as a power FET) in response to a mode signal. Selection of an internal or external mode allows a single converter chip design to be optimized for various applications.

Chip-on-glass technology can be used to mount an integrated circuit ("chip") directly on the glass of an LCD. The chip is typically mounted face down on the glass using an anisotropic conductive film (ACF) such as a silver-filled epoxy. The ACF can be used to selectively form electrical connections between "bumps" on the integrated circuit and conductors on the glass of the LCD. The bumps are typically made from electrodeposited gold on the IC.

Each bump-to-glass connection often can have a relatively high resistance (in the order of tens of ohms), which can be lowered in effect by providing such connections electrically in parallel (which lessens the effective resistance). Multiple bumps may be used to maintain the optimum bump dimensions, while at the same time reducing the total resistance between the integrated circuit and conductors on the glass. Electrical connections between the "bumps" and the glass can be formed anisotropically by applying heat and pressure to the die and the glass during the ACF bonding process. The ACF material is typically used to connect the bumps on the IC to the conductors on the glass.

In the internal FET mode, the DC-DC converter uses an internal FET that is located on the same substrate as the DC-DC converter. The internal FET mode permits certain low cost applications by avoiding some of the costs associated with an external FET. The costs can comprise costs such as the procuring, installing, and providing space in the product for the FET.

In the external FET mode, the DC-DC converter uses an external FET that can be co-located with the LC components. For example, the external FET and LC components can be co-located on a "flexible printed circuit (FPC)," such as is commonly used in LCD applications. The external FET mode improves performance and saves power by avoiding relatively high resistance traces ("wiring") and connections as discussed below with reference to the accompanying figures.

FIG. 1 is a schematic diagram illustrating a display power converter with an external power FET arranged in accordance with the present disclosure. Circuit 100 is partitioned into an external portion arranged on a first substrate X1 and an internal portion arranged on a second substrate X2.

The external portion comprises an inductor L100, a diode Z100, a capacitor C100 and a power FET M100, all arranged on substrate X1. The internal portion comprises a band gap reference voltage generator U100, a switched mode power supply (SMPS) controller U110, voltage regulators U120, and display panel drive circuits U130, all arranged on second substrate X2. The internal portion is typically provided as an integrated circuit that is mounted to the glass of an LCD device using chip-on-glass technology, where the glass serves as substrate X2. The external portion is external to glass substrate X2, where the internal portion is electrically coupled to the external portion using terminals that have relatively high contact resistance. For example, resistor R100 illustrates a parasitic resistance that is coupled between the ground terminal and the internal power supply ground for the various components on substrate X2.

In operation, a voltage (such as VDDDC, which may be a direct current battery voltage that is around three volts) is supplied to circuit 100. The supplied voltage is coupled to inductor L100, which is used (as described below) to boost the input voltage. The supplied voltage is also coupled to band gap reference voltage generator U100, which produces a temperature-stabilized voltage reference signal (e.g., 1.20V) that is used by switched mode power supply controller U110 and the voltage regulators U120.

Switched mode power supply controller U110 uses the supplied input voltage, the band gap voltage reference signal, and feedback from at least one of the output voltages (such as VDDA, which is normally around 5.2 volts) to produce a pulse-width modulated (PWM) signal. The PWM signal is used to control the duty cycle of a power FET (such as M100) for switching inductor L100 to regulate the boosted output voltage. (Other embodiments can use pulse frequency modulation for controlling a switched mode power supply, for example.)

Diode Z100 can be used to rectify the output voltage of the switched inductor L100. Diode Z100 can be any appropriate diode such as a conventional diode or a Schottky diode, for example. The regulated output voltage (VDDA) can be coupled in parallel with a capacitor (such as C100, which can be 4.7 µF) to store charge and filter the output voltage. The regulated output voltage is coupled from substrate X1 to circuitry on substrate X2 via a terminal.

Voltage regulators U120 receive power from power signal VDDA and, in conjunction with the band gap voltage reference signal, produce various signals for driving LCD-related circuitry. For example, voltage regulators U120 can comprise low drop out (LDO) regulators for producing low voltage power signals. Voltage regulators U120 can also comprise switching circuits for switchably coupling power signals to external capacitors (for switched capacitor circuits, for example). Voltage regulators U120 can also supply power used to supply regulated voltages used by other circuitry on substrate X2.

Power FET M100 is used to couple and decouple one terminal of the external inductor L100 to ground. Coupling and decoupling one terminal to ground produces a voltage pulse, for example, from a collapsing magnetic field associated with external inductor L100. This voltage pulse can be higher than the input voltage (VDDDC). The inductor L100 will typically have a high peak current because it is charging for only a portion of the cycle time and discharging for the remaining portion of the cycle time.

Because inductor L100 is external to substrate X2 the resistance of the current path from the inductor L100 to ground is substantially reduced in one conduction path: the path from the inductor L100 through the FET M100 to ground. This conduction path may have high peak currents for which power loss could be substantial. These high currents do not travel through the high resistance paths of the glass substrate (X2) or through the high resistance ACF-bonded bumps on the glass substrate (X2).

Figure 2:
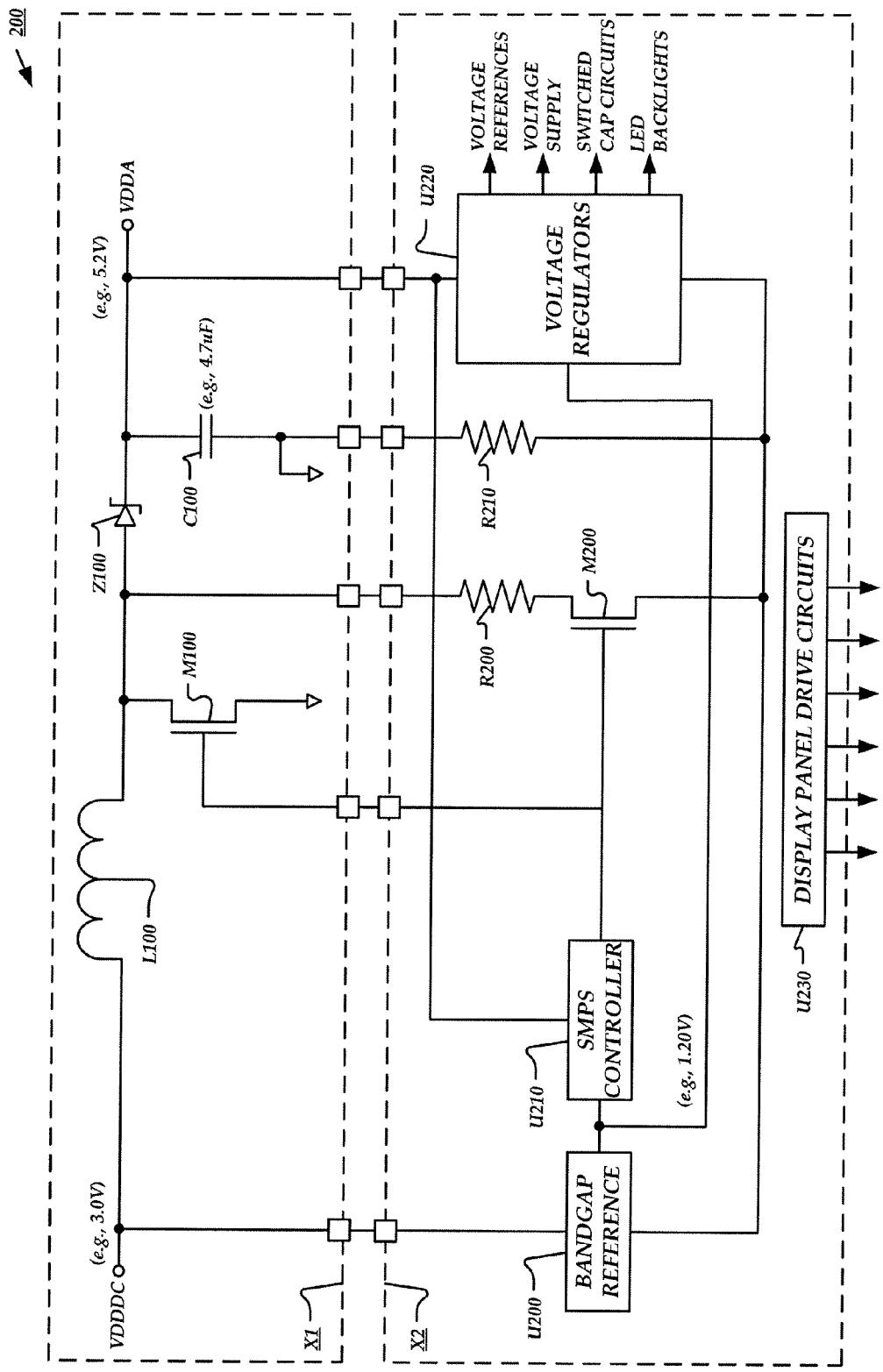
FIG. 2 is a schematic diagram illustrating a display power converter with an externally supplied or internally supplied power FET.

FIG. 2 is a schematic diagram illustrating a display power converter with an externally supplied or internally supplied power FET arranged in accordance with the present disclosure. Circuit 200 is partitioned into an external portion arranged on a first substrate X1 and an internal portion arranged on a second substrate X2.

The external portion again comprises an inductor L100, a diode Z100, a capacitor C100 and a power FET M100, all arranged on substrate X1. The internal portion comprises a band gap reference voltage generator U200, a switched mode power supply (SMPS) controller U210, voltage regulators U220, internal power FET M200 and display panel drive circuits U230, all arranged on second substrate X2. The internal portion is again typically provided as an integrated circuit that is mounted to the glass of an LCD device using chip-on-glass technology, where the glass serves as substrate X2. The external portion is again external to glass substrate X2, where the internal portion is electrically coupled to the external portion using terminals that have relatively high contact resistance. For example, resistor 8200 illustrates a parasitic resistance that is coupled between the switching side of inductor L100 and internal power FET M200, while resistor R210 illustrates a parasitic resistance that is coupled between the ground terminal and the internal power supply ground for the various components on substrate X2.

In operation, a voltage (such as VDDDC, which may be a direct current battery voltage that is around three volts) is supplied to circuit 200. The supplied voltage is coupled to an inductor (e.g., L100), which is used (as described below) to boost the input voltage. The supplied voltage is also coupled to band gap reference voltage generator U200, which produces a temperature-stabilized voltage reference signal that is used by switched mode power supply controller U210 and the voltage regulators U220.

Switched mode power supply controller U210 uses the supplied input voltage, the band gap voltage reference signal, and feedback from at least one of the output voltages (such as VDDA, which is normally around 5.2 volts) to produce a pulse-width modulated (PWM) signal. The PWM signal is used to control the duty cycle of a power FET (such as M200) for switching inductor L100 to regulate the boosted output voltage. (Other embodiments can use pulse frequency modulation for controlling a switched mode power supply, for example.)

Diode Z100 can be used to rectify the output voltage of the switched inductor L100. The regulated output voltage (VDDA) can be coupled in parallel with a capacitor (such as C100, which can be 4.7 µF) to store charge and filter the output voltage. The regulated output voltage is coupled to circuitry on substrate X2 via a terminal.

Voltage regulators U220 receive power from power signal VDDA and, in conjunction with the band gap voltage reference signal, produce various signals for driving LCD-related circuitry. For example, voltage regulators U220 can comprise low drop out (LDO) regulators for producing low voltage power signals. Voltage regulators U220 can also comprise switching circuits for switchably coupling power signals to external capacitors (for switched capacitor circuits, for example). Voltage regulators U220 can also supply power used to supply regulated voltages used by other circuitry on substrate X2.

Internal power FET M200 is used to couple and decouple one terminal of the external inductor L100 to ground. Coupling and decoupling one terminal to ground produces a voltage pulse, for example, from a collapsing magnetic field associated with external inductor L100. This voltage pulse can be higher than the input voltage (VDDDC). The inductor L100 will typically have a high peak current because it is charging for only a portion of the cycle time and discharging for the remaining portion of the cycle time.

Because inductor L100 is external to substrate X2 and power FET M200 is located within substrate X2, current from inductor L100 flows along relatively long traces (of relatively high resistance), crosses a first substrate terminal (also of relatively high resistance) to reach the on-substrate power FET M200, and crosses a second substrate terminal where the current is coupled to ground. Thus, when the internal power FET (M200) is used by itself, current flows along relatively high resistive traces to and from the substrate, as well as crossing two relatively high resistive terminals (see e.g., R200 and R210).

External power FET M100 can also be used to couple and decouple one terminal of the external inductor L100 to ground. When external power FET M100 is used, internal power FET M200 may be left unconnected. Coupling and decoupling one terminal to ground again produces a voltage pulse, for example, from a collapsing magnetic field associated with external inductor L100. However, because inductor L100 is arranged on the same substrate (X1) as power FET M100, current from inductor L100 is predominately shunted to ground with a lower overall resistance when compared to parasitic resistance R200 and R210 from substrate X2. Higher efficiency is achieved with use of the external power FET M100 with an associated increased cost. Where cost is of paramount concern, external power FET M100 can be eliminated and internal power FET M200 is used.

Figure 3:
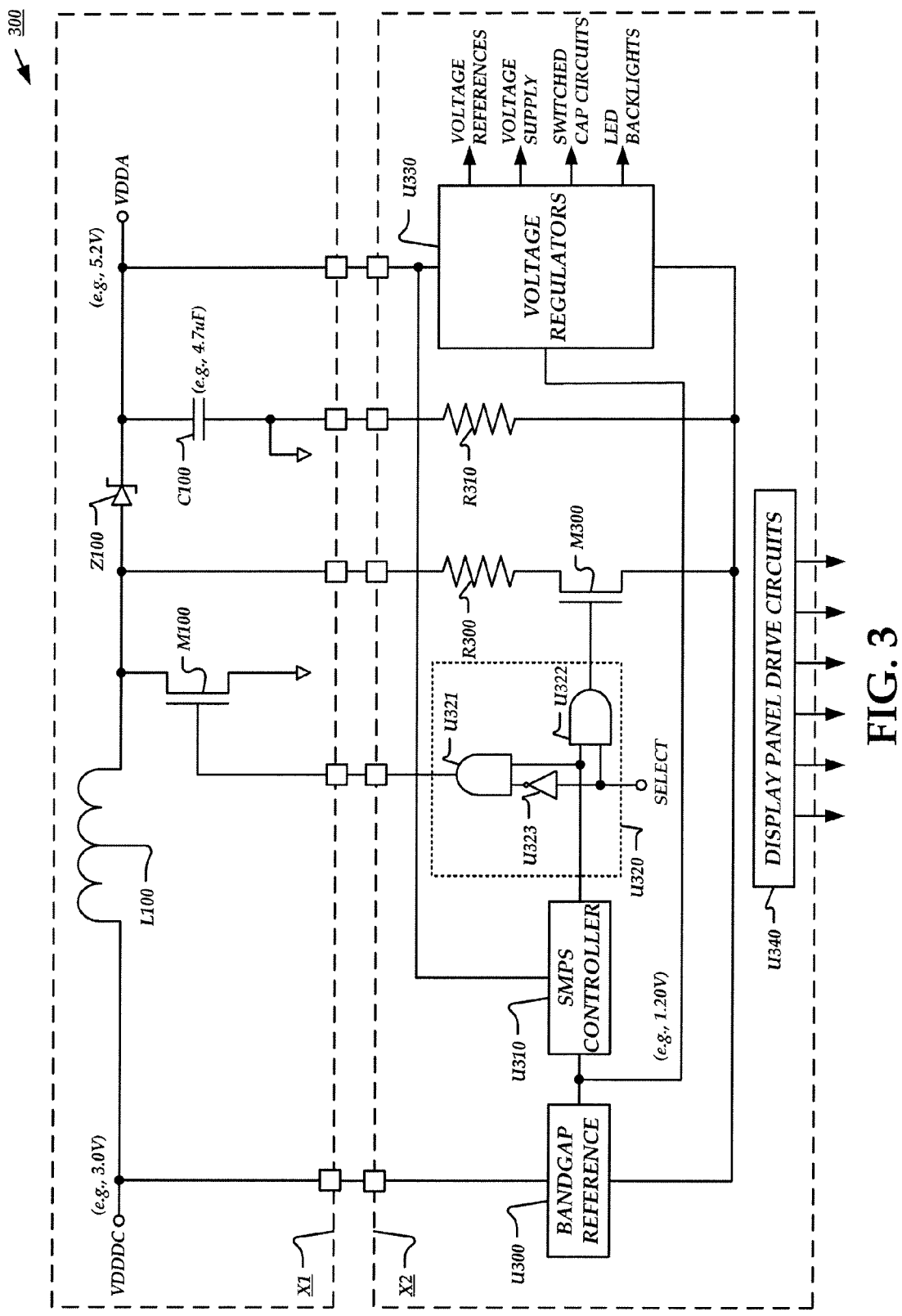
FIG. 3 is a schematic diagram illustrating a display power converter with control circuitry for controlling either an externally supplied or internally supplied power FET.

FIG. 3 is a schematic diagram illustrating a display power converter with control circuitry for controlling either an externally supplied or internally supplied power, arranged in accordance with the present disclosure. Circuit 300 is again partitioned into an external portion arranged on a first substrate X1 and an internal portion arranged on a second substrate X2.

The external portion of circuit 300 again comprises an external inductor L100, a diode Z100, a capacitor C100, and an external power FET M100, all arranged on substrate X1, which can be mounted on a fixture that is external to substrate X1. The internal portion of circuit 300 comprises a band gap reference voltage generator U300, a switched mode power supply (SMPS) controller U310, a control circuit U320, an internal power FET transistor M300, voltage regulators U330, and display panel driver circuits U340. Substrate X2 is again typically implemented with a "chip-on-glass" technology that is electrically coupled to the external components (and signals) using terminals that have relatively high contact resistance. For example, resistor R300 illustrates a parasitic resistance that is coupled between the switching side of inductor L100 and internal power FET M300, while resistor R310 illustrates a parasitic resistance that is coupled between the ground terminal and the internal power supply ground for the various components on substrate X2.

In operation, a voltage (such as VDDDC, which may be direct current voltage that is around three volts) is supplied to circuit 300. The supplied voltage is coupled to band gap reference voltage generator U300, which produces a temperature-stabilized voltage reference signal that is used by switched mode power supply controller U310 and the voltage regulators U330.

Switched mode power supply controller U310 uses the supplied input voltage, the band gap voltage reference signal, and feedback from at least one of the output voltages (such as VDDA, which is normally around 5.2 volts) to produce a pulse-width modulated (PWM) signal, for example. The PWM signal is used to control the duty cycle of a power FET (such as external FET M100) for switching inductor L100 to produce boosted voltages.

Diode Z100 can be used to rectify the output voltage of the switched inductor L100. The regulated output voltage (VDDA) can be coupled in parallel with a capacitor (such as C100, which can be 4.7 µF) to store charge and filter the output voltage. The regulated output voltage is coupled to circuitry on substrate X2 via a terminal, which may have relatively high resistance.

Voltage regulators U330 receive power from power signal VDDA and, in conjunction with the band gap voltage reference signal, produce various signals for driving LCD-related circuitry. For example, voltage regulators U330 can comprise low drop out (LDO) regulators for producing low voltage power signals. Voltage regulators U330 can also comprise switching circuits for switchably coupling power signals to external capacitors (for switched capacitor circuits, for example). Voltage regulators U330 can also supply regulated voltages used by other circuitry on substrate X2.

Control circuit U320 can be any appropriate logic circuit that is arranged to operate as a selection control that selects either the internal power FET M300 or the external power FET M100 for switching operation via the switched mode power supply controller U310. In one example, control circuit U320 includes AND logic circuits U321 and U322 and inverter logic circuit U322. However, other control circuit arrangements are also contemplated.

When mode selection signal SELECT is a logic "zero," for example, logic circuits U321 and U322 allow the PWM signal from switched mode power supply controller U310 to control the gate of external power FET M100 (level shifting circuitry can be provided for driving the gate). When the mode selection signal SELECT is a logic "one", for example, logic circuit U322 allows the PWM signal from switched mode power supply controller U310 to control the gate of internal power FET M300 (with any necessary level shifting circuitry for driving the gate). Control circuit U320 also prevents the PWM signal from driving internal power FET M300 at the same time that power FET M100 is in operation.

When an external FET is used (e.g., M100), the resistance of the current path from the inductor L100 to ground is substantially reduced in one conduction path. This path may have high peak currents for which power loss can be substantial when the path includes an internal power FET (e.g., M300).

External power FET M100 is used to couple and decouple one terminal of the external inductor L100 to ground. The high peak currents through the inductor L100 travel from the inductor L100 through the external power FET M100 and directly to ground or through the inductor L100 and through the diode Z100 to the VDDA capacitor C100. Thus, these high currents do not normally travel through the high resistance paths on the glass or through the high resistance ACF-bonded bumps.

Figure 4:
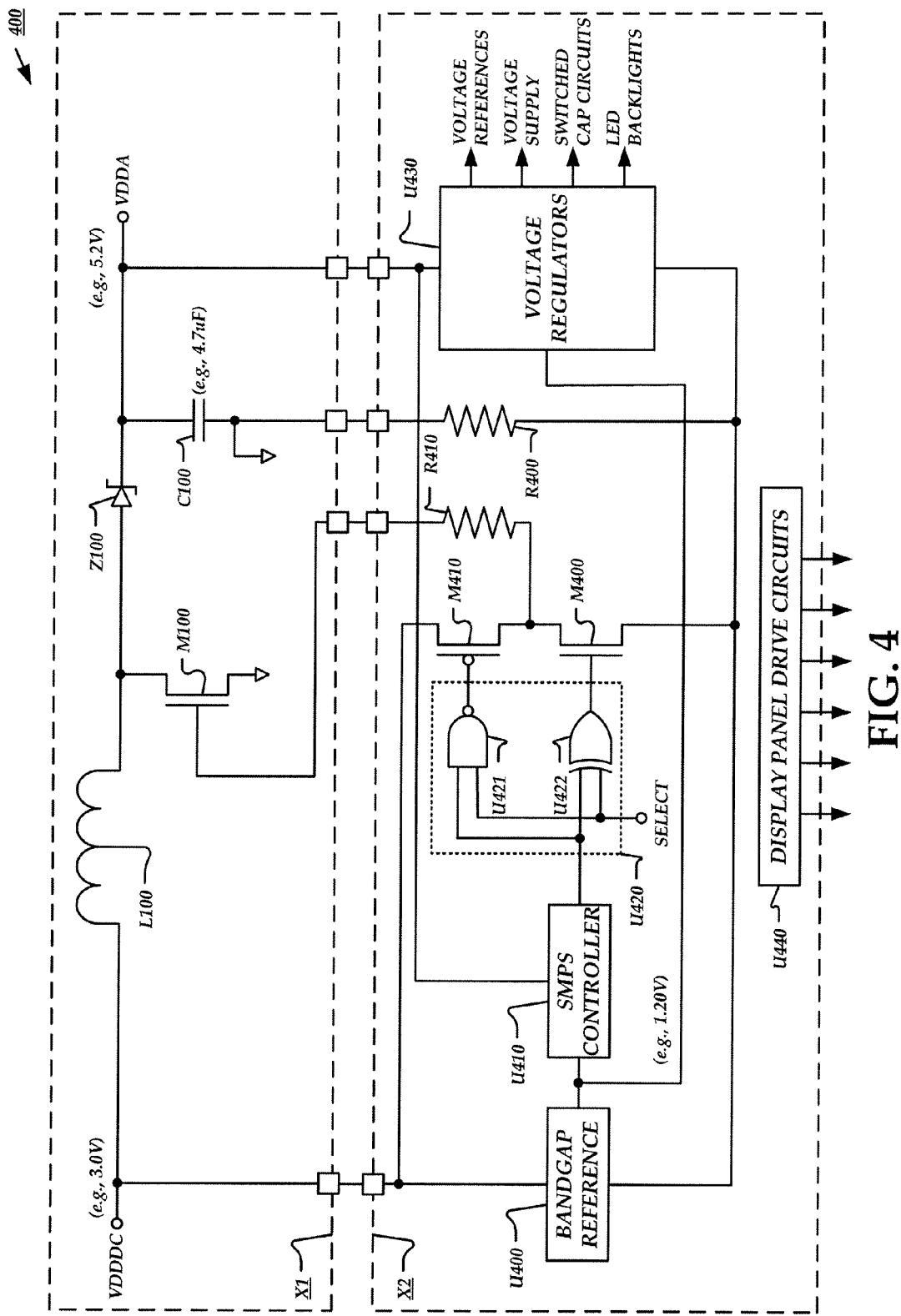
FIG. 4 is a schematic diagram illustrating a display power converter with control circuitry for controlling and driving the gate of an externally supplied power FET, all arranged in accordance with features of the present disclosure.

A common terminal (which reduces the "pin count") can be used in both the external power FET switch and in internal power FET switch configurations. FIG. 4 is a schematic diagram illustrating control circuitry for using a common terminal to control an inductor using an internal or an external switch. Circuit 400 is partitioned into an external portion arranged on a first substrate X1 and an internal portion arranged on a second substrate X2.

The external portion of circuit 400 again comprises an external inductor L100, a diode Z100, a capacitor C100, and an external power FET M100, all arranged on substrate X1, which can be mounted on a fixture that is external to substrate X1. The internal portion of circuit 400 comprises a band gap reference voltage generator U400, a switched mode power supply (SMPS) controller U410, a control circuit U420, an n-type FET M400, a p-type FET M410, voltage regulators U430, and display panel driver circuits U440. Substrate X2 is again typically implemented with a "chip-on-glass" technology that is electrically coupled to the external components (and signals) using terminals that have relatively high contact resistance. For example, resistor R410 illustrates a parasitic resistance that is coupled between the gate terminal of external power FET M100 and an output driver formed by FETs M400 and M410. Also, resistor R400 illustrates a parasitic resistance that is coupled between the ground terminal and the internal power supply ground for the various components on substrate X2.

In operation, a voltage (such as VDDDC, which may be direct current voltage that is around three volts) is supplied to circuit 400. The supplied voltage is coupled to band gap reference voltage generator U400, which produces a temperature-stabilized voltage reference signal that is used by switched mode power supply controller U410 and the voltage regulators U430.

Switched mode power supply controller U410 uses the supplied input voltage, the band gap voltage reference signal, and feedback from at least one of the output voltages (such as VDDA, which is normally around 5.2 volts) to produce a pulse-width modulated (PWM) signal, for example. The PWM signal is used to control the duty cycle of a power FET for switching an external inductor (for example, grounding one terminal of the inductor) to produce boosted voltages.

Control circuit U420 can be any appropriate logic circuit that is arranged to operate as a gate driver control that selects either just the n-type FET M400 or both the p-type FET M410 and the n-type FET M400. In one example, control circuit U420 includes NAND logic circuit U421 and XOR logic circuit U422. However, other control circuit arrangements are also contemplated. In some examples, control circuit U420 is arranged to delay the activation of one transistor (e.g., M400) until the other transistor (e.g., M410) has been completely deactivated to prevent high shoot-through currents that may otherwise occur when both FETS M400 and M410 are simultaneously active.

For the example illustrated in FIG. 4, when mode selection signal SELECT is a logical "zero", for example, p-type FET M410 is disabled by NAND logic circuit U421 while n-type FET M400 is selectively controlled in response to the PWM signal from switched mode power supply controller U410. When mode selection signal SELECT is a logical "one", for example, p-type FET M410 and n-type FET M400 are selectively controlled in response to the PWM signal from switched mode power supply controller U410.

P-type FET M410 and n-type FET M400 are coupled to a common node for controlling the gate of an external power FET for switching operation in a boost converter. In this mode an external switch (e.g., power FET M100) can be used such that switch current from an inductor (e.g., L100), for example, does not have to be routed through relatively high resistance traces to and from the substrate.

The common output node can alternatively be coupled to a terminal of an inductor (e.g., L100) in a boost converter such that the internal power NFET M400 switches the inductor to ground, for example. In this mode, an external switch (e.g, FET M100) is not required. However, the current from the switched inductor (L100) flows through the internal n-type FET M400, which is a power FET, resulting in power loss due to relatively high resistance traces for conducting the current.

Although the invention has been described herein by way of exemplary embodiments, variations in the structures and methods described herein may be made without departing from the spirit and scope of the invention. For example, the positioning and/or sizing of the various components may be varied. Individual components and arrangements of components may be substituted as known to the art. Since many embodiments of the invention can be made without departing from the spirit and scope of the invention, the invention is not limited except as by the appended claims.

What is claimed is:

1. A display power converter circuit comprising:
   an inductor on a first substrate and configured to receive an input supply voltage;
   an external power FET on the first substrate and configured to selectively couple the inductor to ground in response to a control signal;
   a diode on the first substrate and coupled between the inductor and an output node;
   a capacitor coupled between the node and ground, wherein the output node is associated with a boosted supply voltage;
   terminals coupling the first substrate and a second substrate;
   a voltage regulator on the second substrate and configured to receive the boosted supply voltage and generate a regulated voltage;
   a display panel driver circuit on the second substrate and configured to receive the regulated voltage; and
   a switched mode power supply controller on the second substrate and configured to monitor the boosted supply voltage and selectively modulate the control signal.

2. The display power converter circuit of claim 1, wherein the diode is a Schottky diode.

3. The display power converter circuit of claim 1, further comprising:
   an internal power FET on the second substrate;
   wherein the internal power FET includes a gate, a drain, and a source;
   wherein the drain is coupled to the inductor via one of the terminals between the first and second substrates;
   wherein the source is coupled to ground via another one of the terminals between the first and second substrates; and
   wherein the gate is configured to receive the control signal.

4. The display power converter circuit of claim 3, further comprising:
   a control circuit on the second substrate and configured to provide the control signal to one of the external power FET and the internal power FET.

5. The display power converter circuit of claim 4, wherein the control circuit comprises: a first AND logic gate;
   a second AND logic gate; and
   an inverter logic gate;
   wherein the first AND logic gate includes a first input coupled to an output of the switched mode power supply controller, a second input configured to receive a SELECT signal, and an output coupled to the internal power FET;
   wherein the inverter logic gate has an output configured to provide an inverse of the SELECT signal; and
   wherein the second AND logic gate includes a first input configured to receive the inverse of the SELECT signal, a second input coupled to the output of the switched mode power supply controller, and an output coupled to the external power FET.

6. The circuit of claim 1, further comprising a control circuit, an n-type FET and a p-type FET on the second substrate;
   wherein the n-type FET includes a gate, a drain, and a source that is coupled to ground;
   wherein the p-type FET includes a gate, a drain that is coupled to the drain of the n-type FET, and a source configured to receive the input supply voltage;

wherein the control circuit includes an input configured to receive the control signal, a first output coupled to the gate of the n-type FET, and a second output coupled to the gate of the p-type FET; and wherein the control circuit is configured to control operation of the n-type FET and the p-type FET in response to the control signal.

7. The display power converter circuit of claim 6, wherein the control circuit comprises:
a NAND logic gate; and
an XOR logic gate;
wherein the NAND logic gate includes a first input coupled to an output of the switched mode power supply controller, a second input configured to receive a SELECT signal, and an output coupled to the gate of the p-type FET; and
wherein the XOR logic gate includes a first input configured to receive the SELECT signal, a second input coupled to the output of the switched mode power supply controller, and an output coupled to the gate of the n-type FET.

8. The display power converter circuit of claim 6, wherein the drains of the p-type FET and the n-type FET are coupled to the external power FET via one of the terminals between the first and second substrates.

9. The display power converter circuit of claim 6, wherein the source of the p-type FET is coupled to an input node on the first substrate via one of the terminals between the first and second substrates.

10. The display power converter circuit of claim 6, wherein the source of the n-type FET is coupled to the first substrate via one of the terminals between the first and second substrate.

11. The display power converter circuit of claim 1, further comprising:
a band gap reference circuit on the second substrate and configured to generate a reference signal for the switched mode power supply controller and the voltage regulator using the input supply voltage.

12. The display power converter circuit of claim 1, wherein:
the first substrate comprises a flexible printed circuit; and
the second substrate comprises a glass surface of a display device.

13. The display power converter circuit of claim 1, wherein the voltage regulator, the switched mode power supply controller, and the display panel driver circuit are arranged as an integrated circuit in a chip-on-glass configuration.

14. An integrated circuit on a first substrate, the integrated circuit comprising:
a first terminal configured to be coupled to an inductor on a second substrate and to receive an input supply voltage from the second substrate;
a second terminal configured to be coupled to an output node on the second substrate and to receive a boosted supply voltage from the second substrate;
a third terminal configured to be coupled to ground;
a fourth terminal configured to be coupled to at least one of the inductor and an external power FET on the second substrate;
a band gap reference circuit coupled between the first terminal and the third terminal and configured to generate a reference voltage using the input supply voltage;
a voltage regulator coupled between the second terminal and the third terminal and configured to generate a regulated voltage using the boosted supply voltage and the reference voltage;

a display panel driver circuit configured to receive the regulated voltage;
a switched mode power supply controller configured to monitor the boosted supply voltage and selectively modulate the control signal; and
an internal FET that includes a gate configured to be selectively modulated by the control signal, a drain coupled to the fourth terminal, and a source coupled to the third terminal.

15. The integrated circuit of claim 14, further comprising;
a control circuit configured to provide the control signal to a fifth terminal, a drain, and a source coupled to ground;
wherein the fifth terminal is configured to provide the control signal to a gate of the external power FET.

16. The integrated circuit of claim 14, further comprising:
a control circuit configured to selectively provide the control signal to the gate of the internal FET.

17. The integrated circuit of claim 14, further comprising:
a second internal FET and a control circuit;
wherein the second internal FET includes a drain coupled to the fourth terminal, a source coupled to the first terminal, and a gate configured to be selectively modulated by the control signal;
wherein the control circuit is configured to selectively disable the second internal FET and the internal FET is arranged to control a switching time associated with the inductor.

18. The integrated circuit of claim 14, further comprising:
a second internal FET and a control circuit;
wherein the second internal FET includes a drain coupled to the fourth terminal, a source coupled to the first terminal, and a gate configured to be selectively modulated by the control signal;
wherein the control circuit is configured to selectively activate the internal FET and the second internal FET as a gate driver for the external power FET having a gate coupled to the fourth terminal.

19. A method for using a display power converter circuit having first and second substrates, comprising:
generating a reference voltage with a band gap reference circuit on the second substrate, the band gap reference circuit receiving an input supply voltage from the first substrate via a first terminal;
generating a regulated voltage with a voltage regulator on the second substrate using a boosted supply voltage received from the first substrate via a second terminal and the reference voltage, wherein the band gap reference circuit and the voltage regulator are coupled to ground through a third terminal;
operating a display panel driver circuit on the second substrate using the regulated voltage;
evaluating the boosted supply voltage with a switched mode power supply controller and selectively modulating a control signal in response thereto;
providing the control signal to a gate of an internal FET on the second substrate when an internal FET mode is enabled, wherein the internal FET includes a drain coupled to the first substrate via a fourth terminal and a source coupled to the third terminal; and
disabling the internal FET and providing the control signal to the fourth terminal when the internal FET mode is disabled.

20. An integrated circuit on a first substrate, the integrated circuit comprising:
a first configured to be coupled to an inductor on a second substrate and to receive an input supply voltage from the second substrate;

a second terminal configured to be coupled to an output node on the second substrate and to receive a boosted supply voltage from the second substrate;

a third terminal configured to be coupled to ground;

a fourth terminal configured to be coupled to at least one of the inductor and an external power FET on the second substrate;

a means for generating a temperature stabilized reference voltage;

a means for providing a regulated voltage in response to the boosted supply voltage and the temperature stabilized reference voltage;

a switched mode power supply controller configured to monitor the boosted supply voltage and selectively modulate the control signal; and a means for selectively providing the control signal to a gate of an internal FET on the first substrate when an internal FET mode is enabled, wherein the internal FET includes a drain coupled to the fourth terminal and a source coupled to the third terminal, wherein the means for selectively providing is also arranged for disabling the internal FET and providing the control signal to the fourth terminal when the internal FET mode is disabled.

* * * * *